United States Patent
Tsirkin

(10) Patent No.: US 9,948,568 B2
(45) Date of Patent: Apr. 17, 2018

(54) PACKET SIZE CONTROL USING MAXIMUM TRANSMISSION UNITS FOR FACILITATING PACKET TRANSMISSION

(71) Applicant: Red Hat Israel, Ltd., Ra'anana (IL)

(72) Inventor: Michael Tsirkin, Yokneam Illit (IL)

(73) Assignee: Red Hat Israel, Ltd., Ra'anana (IL)

( * ) Notice: Subject to any disclaimer, the term of this patent is extended or adjusted under 35 U.S.C. 154(b) by 195 days.

(21) Appl. No.: 14/870,715

(22) Filed: Sep. 30, 2015

(65) Prior Publication Data
US 2017/0093736 A1    Mar. 30, 2017

(51) Int. Cl.
H04L 12/805    (2013.01)
H04L 29/06    (2006.01)
H04L 29/08    (2006.01)

(52) U.S. Cl.
CPC .............. H04L 47/36 (2013.01); H04L 67/10 (2013.01); H04L 67/125 (2013.01); H04L 67/2842 (2013.01); H04L 69/22 (2013.01); H04L 69/28 (2013.01)

(58) Field of Classification Search
None
See application file for complete search history.

(56) References Cited

U.S. PATENT DOCUMENTS

| | | | |
|---|---|---|---|
| 7,788,369 B2 | 8/2010 | McAllen et al. | |
| 7,840,652 B2 | 11/2010 | Schran et al. | |
| 7,978,681 B2 | 7/2011 | Chung et al. | |
| 7,995,478 B2 | 8/2011 | Takeda et al. | |
| 8,913,507 B2 | 12/2014 | Veteikis et al. | |
| 8,953,601 B2 | 2/2015 | Kaippallimalil et al. | |
| 2005/0041635 A1* | 2/2005 | Chung | H04L 47/10 370/351 |
| 2007/0076618 A1* | 4/2007 | Hirose | H04L 47/10 370/249 |
| 2012/0051236 A1* | 3/2012 | Hegde | H04L 43/10 370/252 |
| 2014/0241144 A1* | 8/2014 | Kashyap | H04L 47/365 370/216 |
| 2015/0131469 A1* | 5/2015 | Kim | H04L 47/365 370/252 |

(Continued)

OTHER PUBLICATIONS

"MTU Tuning for L2TP", Jan. 29, 2008, obtained from www.cisco.com/c/en/us/support/docs/dial-access/virtual-private-dialup-network-vpdn/24320-l2tp-mtu-tuning.html.

(Continued)

Primary Examiner — Kodzovi Acolatse
(74) Attorney, Agent, or Firm — K&L Gates LLP

(57) ABSTRACT

A system and method of facilitating packet transmission comprises a first node, a second node, and an intermediate node. The intermediate node receives a first packet, from the first node, determines a packet size, determines a maximum transmission unit (MTU) size, and determines whether the packet size is greater than the MTU size, sends a second packet to the first node specifying the MTU size to the first node. The first node records a destination mark at the first node, including the MTU size and an identifier of the second node, fragments the first packet into a plurality of fragmented packets, and sends each of the plurality of fragmented packets to the intermediate node. The intermediate node receives each of the plurality of fragmented packets, from the first node, and sends the fragmented packets to the second node.

18 Claims, 4 Drawing Sheets

(56) References Cited

U.S. PATENT DOCUMENTS

2015/0143012 A1    5/2015  Peng et al.

OTHER PUBLICATIONS

McCann et al., "Path MTU Discovery for IP version 6", Digital Equipment Corporation, Xerox PARC; Digital Equipment Corporation, Aug. 1996, obtained from tools.ietf.org/html/rfc1981.
Mathis et al., "Packetization Layer Path MTU Discovery", PSC, Mar. 2007, obtained from www.ietf.org/rfc/rfc4821.txt.
Mirovic, "Differences in MTU Configuration Between IOS and IOS-XR", Feb. 12, 2011, obtained from supportforums.cisco.com/document/58071/differences-mtu-configuration-between-ios-and-ios-xr.
"Configuring the MTU for Layer 2 Interfaces", Nov. 27, 2014, obtained from www.juniper.net/documentation/en_US/junos15.1/topics/task/configuration/vpns-layer2-mtu-configuring.html.

* cited by examiner

PACKET SIZE CONTROL USING MAXIMUM TRANSMISSION UNITS FOR FACILITATING PACKET TRANSMISSION

BACKGROUND

As technology stands today, data transmission is an integral part of computer processing. Data is transmitted within individual devices to accomplish a variety of tasks for the individual devices. Likewise, data is transmitted between nodes, devices, processors, networks, gateways, and other sources, intermediaries and destinations. Technical limitations in data transmission exist, including protocol limits and physical limits. One such limit is the size of data packets being transmitted to any given node. To implement a successful data transmission, the data must be transmitted in packets that are an appropriate size. Often, this means that the data being transmitted to a receiving node cannot be so large that the receiving node is unable to receive and process the data. This size limitation is called the maximum transmission unit (MTU) size. For example, a particular link layer network protocol (e.g., Ethernet) may define an MTU size of 1500 bytes. If a data packet is too large, the data transmission can be negatively affected. For example, the data transmission may be interrupted, slowed, and/or fail entirely.

SUMMARY

The present disclosure provides a new and innovative method and system of facilitating packet transmission. For example, the method includes receiving a first packet, from a first node, at an intermediate node, determining a packet size, which is a size of the first packet received from the first node, and determining a maximum transmission unit (MTU) size for a second node, where the MTU size is a defined maximum packet size that can be transmitted to the second node. It is determined whether the packet size is greater than the MTU size, and responsive to determining that the packet size is greater than the MTU size, sending a second packet to the first node specifying the MTU size to the first node, where the first node records a destination mark in a first node cache table, and the destination mark includes the MTU size and an identifier of the second node, fragmenting the first packet into a plurality of fragmented packets, which have packet sizes less than or equal to the MTU size, and sending each of the plurality of fragmented packets to the intermediate node. Each of the plurality of fragmented packets are received from the first node and sent to the second node.

Additional features and advantages of the disclosed method and system are described in, and will be apparent from, the following Detailed Description and the Figures.

DETAILED DESCRIPTION OF EXAMPLE EMBODIMENTS

Figure 1:
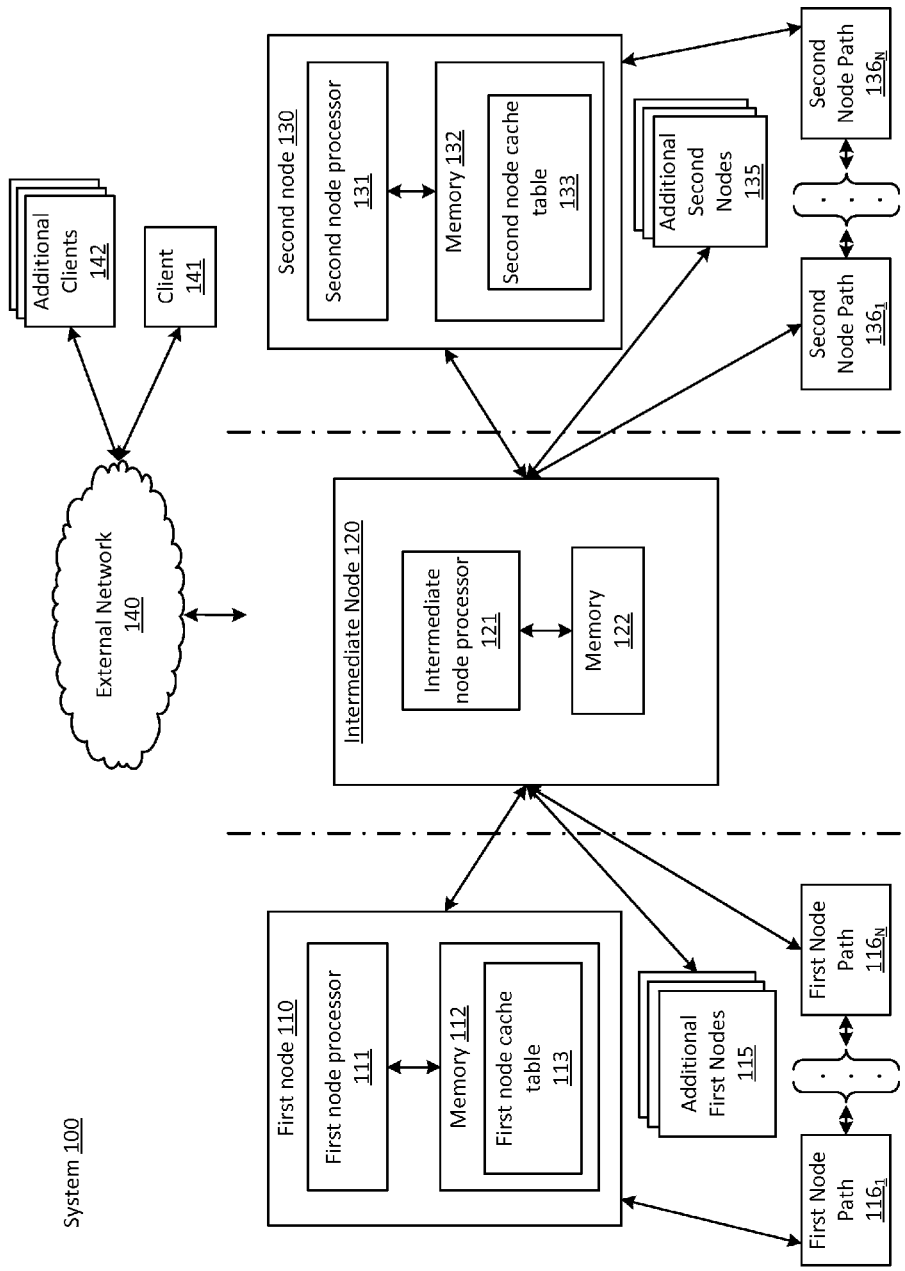
FIG. 1 is a block diagram of an example system of facilitating packet transmission according to an example embodiment of the present disclosure.

FIG. 1 depicts a block diagram of an exemplary system of facilitating packet transmission according to an example embodiment of the present disclosure. The system 100 includes a first node 110, an intermediate node 120, and a second node 130. The first node 110 has a first node processor 111 in communication with a memory 112, which includes a first node cache table 113. The first node 110 is in communication with an intermediate node 120. The intermediate node 120 has an intermediate node processor 121 in communication with a memory 122. The second node 130 has a second node processor 131 in communication with a memory 132, which includes a second node cache table 133. The second node 130 is in communication with the intermediate node 120.

In addition to the first node 110, the system 100 can include a number of additional first nodes 115 that are in communication with the intermediate node 120. Likewise, the system can include a first node path 116. The first node path 116 is a set of first intermediary nodes, $116_1$ to $116_N$, disposed between and in communication with the first node 110 and the intermediate node 120.

In addition to the second node 130, the system 100 can include a number of additional second nodes 135 that are in communication with the intermediate node 120. Likewise, the system can include a second node path 136. The second node path 136 is a set of second intermediary nodes, $136_1$ to $136_N$, disposed between and in communication with the intermediate node 120 and the second node 130.

The system 100 can include an external network 140. The external network 140 is in communication with a client 141 and additional clients 142. The client 141 may communicate with the system 100 via the network 140. For example, the network 140 may be a public network (e.g., the Internet), a private network (e.g., a local area network (LAN) or wide area network (WAN)), or a combination thereof. For example, a client (e.g., the client 141 and/or additional clients 142) may be a personal computing device, server, virtual machine, or application executing on a personal computing device, server, one or more physical processors, etc.

As used herein, a packet can be a data packet including a header and a payload. The data packet typically includes routing information in the header that informs network equipment how to handle the data packet. Routing information is often referred to as overhead.

As used herein, a node can be a host system, a virtual machine, a user device, personal computing device, server, network, one or more physical processors, or any other device which can send or receive a packet.

As used herein, a physical processor or processor refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device or memory refers to a volatile or non-volatile memory device, such as RAM, ROM, EEPROM, or any other device capable of storing data. As discussed herein, I/O device refers to a device capable of providing an interface between one or more processor pins and an external device capable of inputting and/or outputting binary data. The system 100 can further include a computer readable medium storing instructions, which, when executed by a test system controller, cause the test system controller to operate in the ways described.

Figure 2:
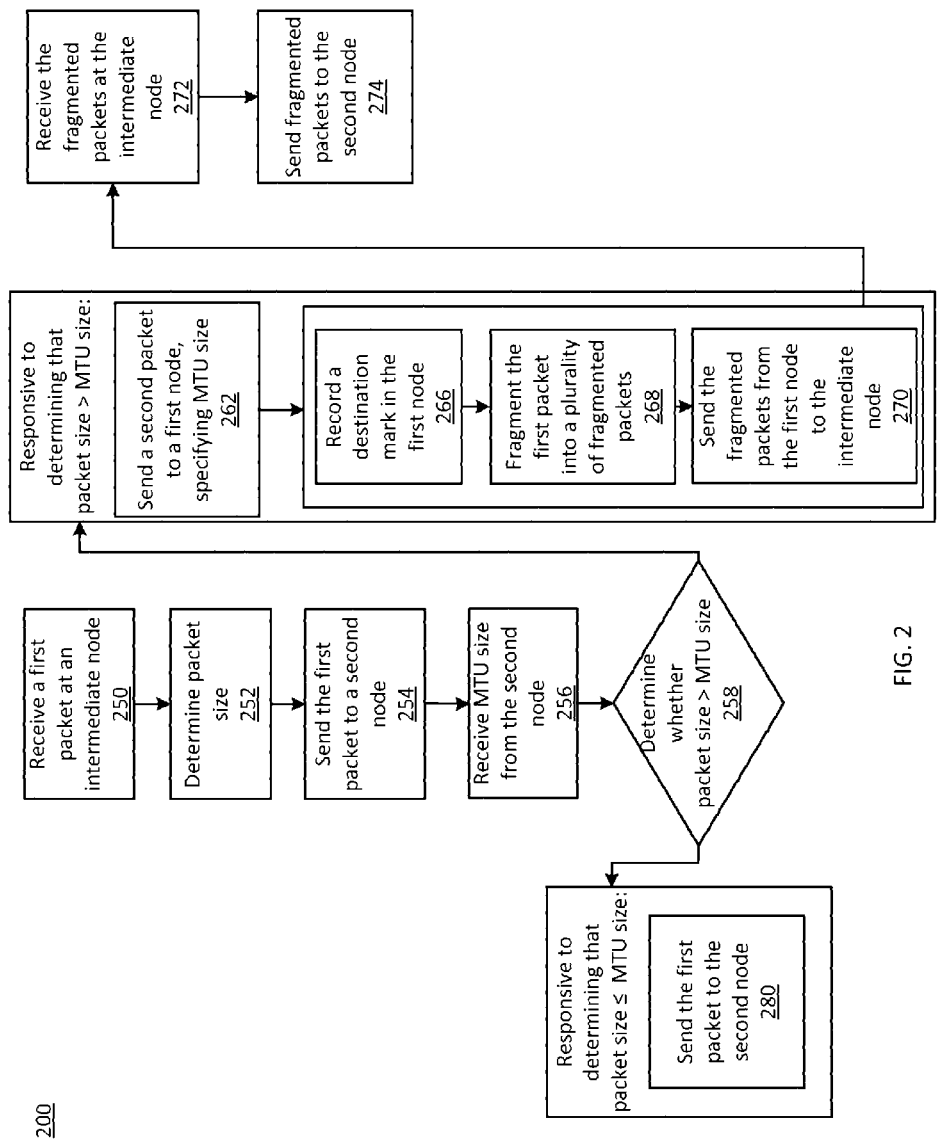
FIG. 2 is a flowchart of an example method of facilitating packet transmission according to an example embodiment of the present disclosure.

FIG. 2 depicts a flowchart of an example method of facilitating packet transmission according to an example embodiment of the present disclosure. Although the example method 200 is described with reference to the flowchart illustrated in FIG. 2, it will be appreciated that many other methods of performing the acts associated with the method may be used. For example, the order of some of the blocks may be changed, certain blocks may be combined with other blocks, and some of the blocks described are optional. The method may be performed by processing logic that may comprise hardware (e.g., circuitry, dedicated logic, etc.), software, or a combination of both.

The example method 200, as performed by a system, starts by receiving a first packet (e.g., image data of a webpage) (block 250) at an intermediate node (e.g., a software bridge). The first packet is initially sent from a first node (e.g., an image server). In an example embodiment, the first node is a source node. The first node and the intermediate node are in communication with one another. In an example embodiment, a plurality of other intermediary nodes is disposed between the first node and the intermediate node. Upon receipt of the first packet (block 250), the intermediate node determines a packet size (block 252). In an example embodiment, the packet size considers both the header and the payload, such that the packet size is the total physical size of the first packet (e.g. 1 kB). In an example embodiment, the packet size determination is made by the intermediate node processor 121.

The intermediate node sends the first packet to a second node (e.g., a personal computer) (block 254). In an example embodiment, the second node is a destination node. The intermediate node and the second node are in communication with one another. In an example embodiment, a plurality of other intermediary nodes is disposed between intermediate node and the second node.

Upon receipt of the first packet, the second node sends a MTU size (e.g., 300 B) to the intermediate node. The MTU size is a physical size limitation as dictated by the second node. In an example embodiment, the MTU size is a defined maximum packet size that can be transmitted to the second node. The intermediate node receives the MTU size from the second node (block 256). In an example embodiment, the MTU size is only sent to the intermediate node when the packet is too large to be transmitted to the second node (e.g., if the packet can be transmitted to the second node, it is properly transmitted and no MTU size is sent to the intermediate node). In a different example embodiment, upon initial receipt of the first packet at the intermediate node, the intermediate node has the appropriate information to determine the MTU size for the desired second node, without having to query the second node or send the first packet to the second node.

The intermediate node then determines whether the packet size is greater than the MTU size (e.g., is 1 kB>300 B?) (block 258). In an example embodiment, this determination is made by an intermediate node processor 121.

Responsive to determining that the packet size is greater than the MTU size (e.g., 1 kB>300 B), the intermediate node sends a second packet back to the first node specifying the MTU size (e.g., 300 B) (block 262). For example, MTU size is included in the header of the second packet when sent to the first node. In a different example embodiment, the MTU size is sent to the first node separately from the second packet. In a different example embodiment, the first packet and the second packet are the same packet. The first node then records a destination mark (block 266). In an example embodiment, the destination mark is recorded in a first node cache table 113. Additionally, the destination mark includes the MTU size (e.g., 300 B) and an identifier of the second node (e.g., a software address location, IP address, MAC address, port number, etc.). The first node then fragments the first packet into a plurality of fragmented packets (block 268) (e.g., a Packet, P, is fragmented into $P_1$, $P_2$, $P_3$, and $P_4$). In an example embodiment, the fragmenting is done by the first node processor 111. By fragmenting the first packet into a plurality of fragmented packets, each of the plurality of fragmented packets have packet sizes less than or equal to the MTU size (e.g., fragmented packets have packet sizes of 250 B each). In an example embodiment, each of the plurality of fragmented packets has an equivalent size (e.g., each of $P_1$, $P_2$, $P_3$, and $P_4$ has a packet size of 250 B). In a different example embodiment, each of the plurality of fragmented packets has a different size (e.g., $P_1$, $P_2$, $P_3$, and $P_4$ have packet sizes of 230 B, 240 B, 260 B, and 270 B respectively). The first node then sends the fragmented packets (e.g., $P_1$, $P_2$, $P_3$, and $P_4$) from the first node to the intermediate node (block 270).

The intermediate node receives the fragmented packets (block 272) and sends the fragmented packets (e.g., $P_1$, $P_2$, $P_3$, and $P_4$) to the second node (block 274). It is desirable that the intermediate node (e.g., a software bridge) avoids fragmentation (e.g., by having the first node fragment the packets) so as to preserve resources at the intermediate node. Because each of the plurality of fragmented packets have packet sizes less than or equal to the MTU size (e.g., 250 B<300 B), each of the plurality of fragmented packets is successfully transmitted to the second node. In an example embodiment, the second node can then de-fragment the plurality of fragmented packets, such that an original packet can be re-constructed from the plurality of fragmented packets (e.g., $P_1$, $P_2$, $P_3$, and $P_4$ are de-fragmented into the Packet, P).

In an alternate example embodiment, a new packet, which is much smaller (e.g., 100 B), is received by the intermediate node (block 250). The intermediate node determines a new packet size (block 252), sends the new packet to a second node (block 254) and receives the MTU size (e.g., 300 B) from the second node (block 256). The intermediate node then determines whether the new packet size is greater than the MTU size (e.g., is 100 B>300 B?) (block 258). In an example embodiment, this determination is made by an intermediate node processor 121. Responsive to determining that the new packet size is less than or equal to the MTU size (e.g., 100 B<300 B), the intermediate node sends the packet to the second node (block 280).

Figure 3:
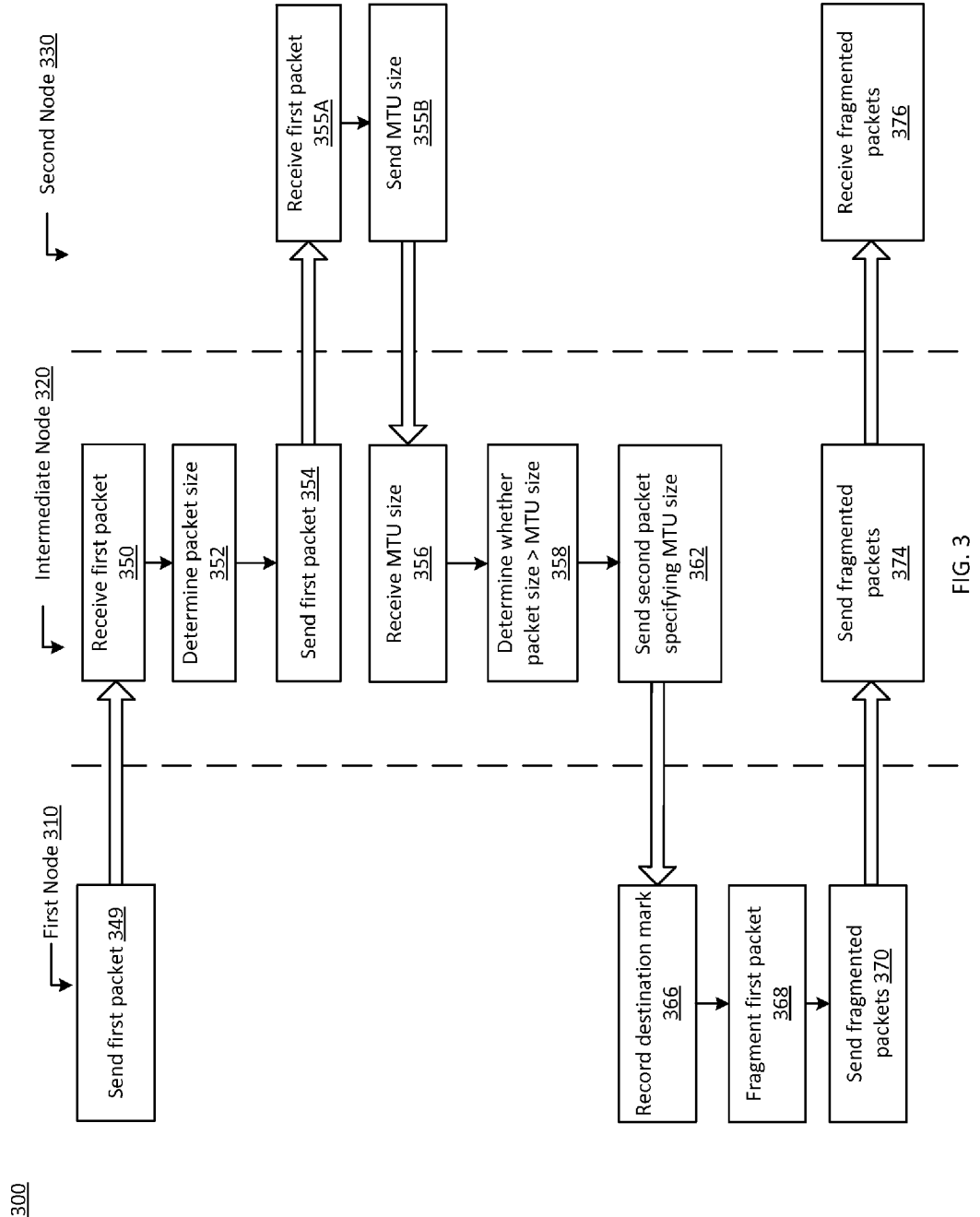
FIG. 3 is a flow diagram illustrating an example method of facilitating packet transmission according to an example embodiment of the present disclosure.

FIG. 3 depicts a flow diagram illustrating an example method of facilitating packet transmission according to an example embodiment of the present disclosure. Although the example method 300 is described with reference to the flowchart illustrated in FIG. 3, it will be appreciated that many other methods of performing the acts associated with the method may be used. For example, the order of some of the blocks may be changed, certain blocks may be combined with other blocks, and some of the blocks described are optional. The method may be performed by processing logic that may comprise hardware (e.g., circuitry, dedicated logic, etc.), software, or a combination of both.

The example method 300, as performed by a system starts, at a first node 310, by sending a first packet (block 349) to an intermediary node 320. The intermediate node 320 receives the first packet (block 350) and determines a packet size (block 352). The intermediate node 320 then sends the first packet (block 354) to a second node 330. The second node 330 receives the first packet (block 355A). In an example embodiment, although the second node 330 receives the first packet, the first packet is too large to be handled properly. The second node 330 then sends a MTU size to the intermediate node 320 (block 355B). In a different example embodiment, upon receipt of the first packet (block 350) at the intermediate node 320, the intermediate node 320 has the appropriate information to determine the MTU size for the desired second node 330, without having to query the second node 330 or send the first packet to the second node 330.

The intermediate node 320 receives the MTU size (block 356) and determines whether the packet size is greater than the MTU size (block 358). The intermediate node 320 then sends a second packet specifying the MTU size to the first node 310 (block 362). In an example embodiment, the second packet includes a header with the MTU size. In an example embodiment, the second packet is the first packet with additional information such as the MTU size. The first node 310 records a destination mark (block 366). The first node 310 then fragments the first packet (block 368). The first node 310 sends the fragmented packets (block 370) to the intermediate node 320. The intermediate node 320 then sends the fragmented packets (block 374) to the second node 330, wherein the second node 330 receives the fragmented packets (block 376).

Figure 4:
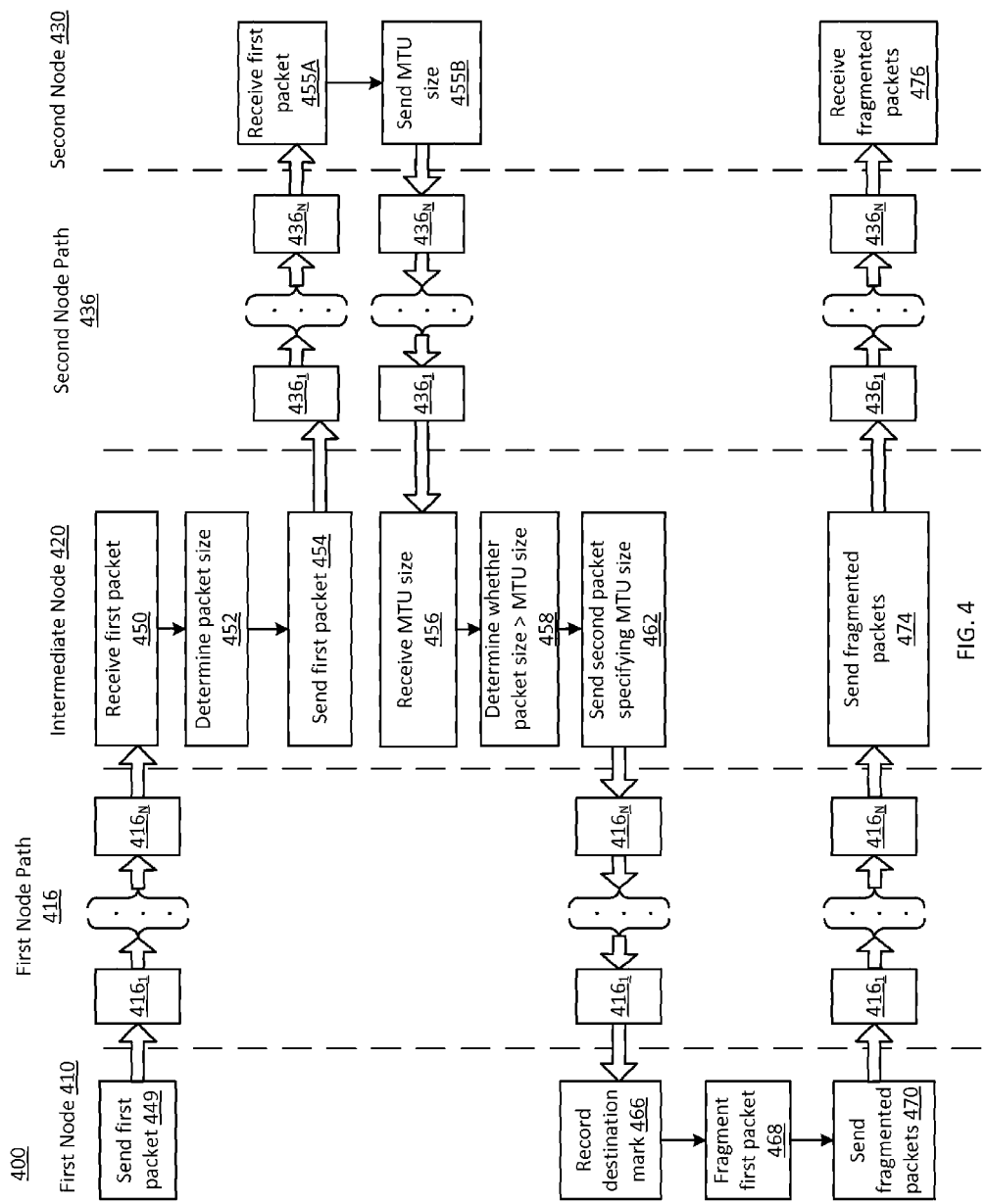
FIG. 4 is a flow diagram illustrating an example method of facilitating packet transmission along a plurality of node paths according to an example embodiment of the present disclosure.

FIG. 4 depicts a flow diagram illustrating an example method of facilitating packet transmission along a plurality of node paths according to an example embodiment of the present disclosure. Although the example method is described with reference to the flow diagram illustrated in FIG. 4, it will be appreciated that many other methods of performing the acts associated with the method may be used. For example, the order of some of the blocks may be changed, certain blocks may be combined with other blocks, and some of the blocks described are optional. The method may be performed by processing logic that may comprise hardware (e.g., circuitry, dedicated logic, etc.), software, or a combination of both.

The example method 400, as performed by a system (e.g., a software defined network), starts at a first node 410 (e.g., a virtual machine), by sending a first packet (block 449) to an intermediate node 420 (e.g., an L2 bridge). In an example embodiment, the first packet is received, by the L2 bridge, on a first link. In an example embodiment, the first link has transmission limitations, such that the first link dictates the MTU size of the packet. By implementation of an intermediate node, such as an L2 bridge, packet transmission can be facilitated through non-Internet protocol uses, such as software defined networking (e.g., L2 tunneling). This provides support of non-Internet protocol traffic. In an example embodiment, the first node 410 is a source node (e.g., a virtual machine located on a media access control (MAC) layer). A first node path 416, a set of first intermediary nodes $416_1$ to $416_N$, is disposed between and in communication with the first node 410 and the intermediate node 420. By sending a first packet (block 449), the first node 410 sends the first packet from the first node 410, through the set of first intermediary nodes, $416_1$ to $416_N$, to the intermediate node 420. In an example embodiment, each of the plurality of first intermediary nodes, $416_1$ to $416_N$ has an intermediary maximum transmission unit.

The intermediate node 420 receives the first packet (block 450) and determines a packet size (block 452). In an example embodiment, determining packet size (block 452) includes determining the size of the first packet received (block 450). The intermediate node 420 then sends the first packet (block 454) to a second node 430 (e.g., a virtual machine). In an example embodiment, the second node 430 is a destination node (e.g., a virtual machine located on a media access control (MAC) layer), such that the L2 bridge provides switching capability between sources and destinations using MAC addresses. In an example embodiment, the first packet is sent, from the L2 bridge to the second node, on a second link. In an example embodiment, the second link has transmission limitations, such that the second link dictates the MTU size of the packet.

A second node path 436, a set of second intermediary nodes $436_1$ to $436_N$, is disposed between and in communication with the intermediate node 420 and the second node 430. In an example embodiment, each of the plurality of second intermediary nodes, $436_1$ to $436_N$, has an intermediary maximum transmission unit. By sending a first packet (block 454), the intermediate node 420 sends the first packet from the intermediate node 420, through the set of second intermediary nodes, $436_1$ to $436_N$, to the second node 430. The second node 430 "receives" the first packet (block 455A). In an example embodiment, the second node 430 does not actually "receive" the first packet, because the first packet is too large to receive. The second node 430 then sends a MTU size (block 455B) to the intermediate node 420. The MTU size is a defined maximum packet size that can be transmitted to the second node 430. For example, the MTU size can be limited by the second node 430 and any of the intermediary maximum transmission units associated with the set of second intermediary nodes $436_1$ to $436_N$ along the second node path 436. This MTU size is sent along the second node path 436. In an example embodiment, for a specific node that generates the lowest MTU size along the second node path 436, the MTU size is the maximum size receivable at that specific node.

In a different example embodiment, upon receipt of the first packet (block 450) at the intermediate node 420, the intermediate node 420 has the appropriate information to determine the MTU size for the desired second node 430 and the second node path 436, without having to query the second node 430 or send the first packet to the second node 430.

The intermediate node 420 receives the MTU size (block 456) and determines whether the packet size is greater than the MTU size (block 458). In an example embodiment, the intermediate node 420 likewise receives the intermediary maximum transmission unit of each of the plurality of second intermediary nodes, $436_1$ to $436_N$, such that all of the intermediary maximum transmission units are taken into account in sending the second packet specifying the MTU size (block 462) to the first node 410. In an example embodiment, the second packet is sent, from the L2 bridge to the first node, on the first link. While merely dropping MTU size to a minimum value (e.g., 10 bytes) could facilitate packet transmission, determining a MTU size provides configuration and optimization across the intermediate node (e.g., L2 software bridge) and the entire system. Furthermore, facilitating packet transmission with properly configured MTU sizes, in the presence of mixed-MTU networks, optimizes the usable MTU size to be as high as possible, ensuring better performance. Correct MTU size usage makes mixed-MTU networks and systems easier to use out of the box.

The intermediate node 420 then sends a second packet specifying the MTU size (block 462) to the first node 410. This second packet and MTU size are sent along the first node path 416. In an example embodiment, responsive to receiving the second packet specifying the MTU size, when sent (block 462) from the intermediate node 420, the first node 410 sends a size query to the intermediate node 420, wherein the intermediate node 420 sends the size query to the second node 430, to a plurality of other second nodes (e.g., a number of additional second nodes 135 that are in communication with the intermediate node 420, a second node path 436, as a set of second intermediary nodes, 436₁ to 436$_N$, etc.). The first node 410 thereby receives the MTU size and a plurality of other MTU sizes associated with the plurality of other second nodes. The first node 410 records the destination mark and a plurality of other destination marks, wherein the plurality of other destination marks include the plurality of other MTU sizes and a plurality of other identifiers, in the first node cache table 113 (e.g., an address resolution protocol (ARP) cache table). In an example embodiment, a Linux operating system implements the ARP cache table associated with storage and mapping of destination marks.

In a similarly related example embodiment, the size query effectively retrieves all possible MTU sizes, and records all possible MTU sizes, in the first node cache table 113. In a similarly related example embodiment, the MTU sizes associated with the plurality of other second nodes include only the MTU sizes that are greater than the packet size (e.g., MTU sizes that are less than the packet size are not retrieved). In this example embodiment, only MTU sizes where the packet would be too large are relevant to the size query.

In a similarly related example embodiment, the size query includes a security cookie. Each time the size query is sent, by the first node 410, to the intermediate node 420 and the second node 430, the size query may include the security cookie. The second node 430 receives the security cookie. When responding to the size query, by sending the MTU size to the intermediate node 420, the second node 430 includes the security cookie with the response. Responsive to receiving the security cookie with the MTU size, the first node records the destination mark. By comparison, if an MTU size is sent without the security cookie, the first node does not record the destination mark. In a similarly related example embodiment, the second node and any of the other second nodes include the security cookie when responding to the size query. Use of the security cookie ensures that the destination mark and any of the other destination marks are only recorded for the second node and any of other second nodes that responded to the size query with the security cookie. Implementation of a security cookie within the size query allows the system to avoid a malicious node pretending to be a first node, and improperly acquiring the MTU size from a second node. By implementing a security cookie, this security feature ensures that nodes not on a particular path (e.g., first node, intermediate node, second node) will not affect the MTU size determined for fragmentation purposes.

The first node 410 records a destination mark (block 466). In an example embodiment, the destination mark, recorded by the first node 410, has a timeout value. Upon expiration of the timeout value, the destination mark is removed from the first node cache table 113. By implementing the timeout value, the cache table is kept updated and current, thereby avoiding "aged" data. In an example embodiment, the first node records the destination mark (block 466) in a first node cache table 113. Moreover, the destination mark includes the MTU size and an identifier of the second node 430. The first node cache table 113 can be used by the first node when sending an additional packet. In an example embodiment, prior to sending an additional packet (e.g., block 449) to the intermediate node 420, the first node 410 determines the identifier of the second node 430. The first node 410 then queries the first node cache table 113 for the destination mark associated with the identifier. Responsive to locating the destination mark in the first node cache table 113, the first node 410 fragments the additional packet into a plurality of additional fragmented packets, wherein the additional fragmented packets have packet sizes less than or equal to the MTU size as specified by the destination mark.

The first node 410 then fragments the first packet (block 468). In an example embodiment, the fragmented packets have packet sizes less than or equal to the MTU size. The first node 410 sends the fragmented packets (block 470) to the intermediate node 420. The fragmented packets are sent along the first node path 416. The intermediate node 420 then sends the fragmented packets (block 474) to the second node 430, wherein the second node 430 receives the fragmented packets (block 476). The fragmented packets are sent form the first node to the second node along the second node path 436.

Facilitating packet transmission, as discussed herein, can be used with a number of different modalities. For example, closed-source development tools (e.g., Red Hat Developer Toolset, Microsoft Visual studio/source safe, etc.) and companies that have proprietary bridging solutions may implement packet transmission as discussed above. Additionally, the packet transmission system and methods can leverage cloud capabilities. Cloud vendors (e.g., Red Hat, Microsoft, etc.), have closed-source based cloud offerings that can be integrated into these tools.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. Without limiting the following description, in a first example aspect of the present disclosure, a method of facilitating packet transmission comprises receiving a first packet, from a first node, at an intermediate node. The method further comprises determining a packet size, wherein the packet size is a size of the first packet received from the first node. The method further comprises determining a maximum transmission unit (MTU) size for a second node, wherein the MTU size is a defined maximum packet size that can be transmitted to the second node. The method further comprises determining whether the packet size is greater than the MTU size. The method further comprises, responsive to determining that the packet size is greater than the MTU size, sending a second packet to the first node specifying the MTU size to the first node, wherein the first node records a destination mark at the first node, wherein the destination mark includes the MTU size and an identifier of the second node, fragments the first packet into a plurality of fragmented packets, wherein the fragmented packets have packet sizes less than or equal to the MTU size, and sends each of the plurality of fragmented packets to the intermediate node. The method further comprises receiving each of the plurality of fragmented packets from the first node and sending the fragmented packets to the second node.

In accordance with another example aspect of the present disclosure, which may be used in combination with any one or more of the preceding aspects, determining the MTU size further comprises sending the first packet to the second node and receiving the MTU size from the second node.

In accordance with another example aspect of the present disclosure, which may be used in combination with any one or more of the preceding aspects, the first node has a cache table that records the destination mark.

In accordance with another example aspect of the present disclosure, which may be used in combination with any one or more of the preceding aspects, a plurality of first intermediary nodes exist between the first node and the intermediate node and a plurality of second intermediary nodes exist between the intermediate node and the second node.

In accordance with another example aspect of the present disclosure, which may be used in combination with any one or more of the preceding aspects, each of the plurality of first intermediary nodes and each of the plurality of second intermediary nodes has an intermediary maximum transmission unit.

In accordance with another example aspect of the present disclosure, which may be used in combination with any one or more of the preceding aspects, the destination mark further includes a timeout value, wherein upon expiration of the timeout value, the destination mark is removed from the first node cache table.

In accordance with another example aspect of the present disclosure, which may be used in combination with any one or more of the preceding aspects, the first node is a source node and the second node is a destination node.

In a second example aspect of the present disclosure, a method of facilitating packet transmission comprises sending a first packet to an intermediate node, wherein the intermediate node determines a packet size, wherein the packet size is a size of the first packet sent from a first node, determines a maximum transmission unit (MTU) size for a second node, wherein the MTU size is a defined maximum packet size that can be transmitted to the second node, determines whether the packet size is greater than the MTU size, and responsive to determining that the packet size is greater than the MTU size: sends a second packet to the first node, and specifies the MTU size to the first node. The method further comprises recording a destination mark at the first node, wherein the destination mark includes the MTU size and an identifier of the second node. The method further comprises fragmenting the first packet into a plurality of fragmented packets, wherein the fragmented packets have packet sizes less than or equal to the MTU size. The method further comprises sending each of the plurality of fragmented packets to the intermediate node, wherein the intermediate node sends each of the plurality of fragmented packets to the second node.

In accordance with another example aspect of the present disclosure, which may be used in combination with any one or more of the preceding aspects, prior to sending an additional packet to the intermediate node, the first node: determines the identifier of the second node, locates the destination mark associated with the identifier, and responsive to locating the destination mark in the first node cache table, fragments the additional packet into a plurality of additional fragmented packets, wherein the additional fragmented packets have packet sizes less than or equal to the MTU size as specified by the destination mark.

In accordance with another example aspect of the present disclosure, which may be used in combination with any one or more of the preceding aspects, the method further comprises, responsive to receiving the second packet and the MTU size from the intermediate node, sending a size query to the intermediate node, wherein the intermediate node sends the size query to the second node and a plurality of other second nodes, receiving the MTU size and a plurality of other MTU sizes associated with the plurality of other second nodes, and recording the destination mark and a plurality of other destination marks in the first node cache table, wherein the plurality of other destination marks include the plurality of other MTU sizes and a plurality of other identifiers.

In accordance with another example aspect of the present disclosure, which may be used in combination with any one or more of the preceding aspects, the plurality of other MTU sizes comprises the other MTU sizes which are greater than the packet size.

In accordance with another example aspect of the present disclosure, which may be used in combination with any one or more of the preceding aspects, the size query includes a security cookie, such that the second node includes the security cookie when sending the MTU size to the intermediate node and, responsive to receiving the security cookie with the MTU size, the first node records the destination mark.

In accordance with another example aspect of the present disclosure, which may be used in combination with any one or more of the preceding aspects, a plurality of first intermediary nodes exist between the first node and the intermediate node and a plurality of second intermediary nodes exist between the intermediate node and the second node.

In accordance with another example aspect of the present disclosure, which may be used in combination with any one or more of the preceding aspects, each of the plurality of first intermediary nodes and each of the plurality of second intermediary nodes has an intermediary maximum transmission unit.

In accordance with another example aspect of the present disclosure, which may be used in combination with any one or more of the preceding aspects, the destination mark further includes a timeout value, wherein upon expiration of the timeout value, the destination mark is removed from the first node cache table.

In a third example aspect of the present disclosure, a system of facilitating packet transmission comprises a first node, including a first node memory and one or more first node processors in communication with the first node memory. The system further comprises a second node, including a second node memory and one or more second node processors in communication with the second node memory. The system further comprises an intermediate node, including an intermediate node memory and one or more intermediate node processors in communication with the intermediate node memory. The intermediate node is configured to receive a first packet, from the first node, determine a packet size, wherein the packet size is a size of the first packet received from the first node, determine a maximum transmission unit (MTU) size, for the second node, wherein the MTU size is a defined maximum packet size that can be transmitted to the second node, determine whether the packet size is greater than the MTU size, responsive to determining that the packet size is greater than the MTU size: send a second packet to the first node specifying the MTU size to the first node. The first node is configured to record a destination mark at the first node, wherein the destination mark includes the MTU size and an identifier of the second node, fragment the first packet into a plurality of fragmented packets, wherein the fragmented packets have packet sizes less than or equal to the MTU size, and send each of the plurality of fragmented packets to the intermediate node. The intermediate node is further configured to receive each of the plurality of fragmented packets, from the first node and send the fragmented packets to the second node.

In accordance with another example aspect of the present disclosure, which may be used in combination with any one or more of the preceding aspects, determining the MTU size further comprises sending the first packet to the second node and receiving the MTU size from the second node.

In accordance with another example aspect of the present disclosure, which may be used in combination with any one or more of the preceding aspects, the first node has a cache table that records the destination mark.

In accordance with another example aspect of the present disclosure, which may be used in combination with any one or more of the preceding aspects, a plurality of first intermediary nodes exist between the first node and the intermediate node and a plurality of second intermediary nodes exist between the intermediate node and the second node.

In accordance with another example aspect of the present disclosure, which may be used in combination with any one or more of the preceding aspects, each of the plurality of first intermediary nodes and each of the plurality of second intermediary nodes has an intermediary maximum transmission unit.

In accordance with another example aspect of the present disclosure, which may be used in combination with any one or more of the preceding aspects, the intermediate node is an L2 bridge, such that the first packet is received, by the L2 bridge, on a first link, the first packet is sent, from the L2 bridge to the second node, on a second link, and the second packet is sent, from the L2 bridge to the first node, on the first link.

In accordance with another example aspect of the present disclosure, which may be used in combination with any one or more of the preceding aspects, the first link has a first link MTU size and the second link has a second link MTU size.

In accordance with another example aspect of the present disclosure, which may be used in combination with any one or more of the preceding aspects, the first node and the second node are virtual machines, implemented by a hypervisor.

In accordance with another example aspect of the present disclosure, which may be used in combination with any one or more of the preceding aspects, the first node and the second node are located on a media access control (MAC) layer.

In accordance with another example aspect of the present disclosure, which may be used in combination with any one or more of the preceding aspects, the first node cache table is an address resolution protocol (ARP) cache table.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of facilitating packet transmission, the method comprising:
   receiving a first packet, from a first node, at an intermediate node;
   determining a packet size, wherein the packet size is a size of the first packet received from the first node;
   determining a maximum transmission unit (MTU) size for a second node, wherein the MTU size is a defined maximum packet size that can be transmitted to the second node, and wherein determining the MTU size includes:
      sending the first packet to the second node, and
      receiving the MTU size from the second node;
   determining whether the packet size is greater than the MTU size;
   responsive to determining that the packet size is greater than the MTU size:
      sending a second packet, to the first node, the second packet specifying the MTU size to the first node, wherein the first node:
         records a destination mark at the first node, wherein the destination mark includes the MTU size and an identifier of the second node,
         fragments the first packet into a plurality of fragmented packets, wherein the fragmented packets have packet sizes less than or equal to the MTU size, and
         sends each of the plurality of fragmented packets to the intermediate node, and
      receiving each of the plurality of fragmented packets from the first node; and
   sending the fragmented packets to the second node.

2. The method of claim 1, wherein the first node has a cache table that records the destination mark.

3. The method of claim 1, wherein the destination mark further includes a timeout value, wherein upon expiration of the timeout value, the destination mark is removed from the first node.

4. The method of claim 1, wherein a plurality of first intermediary nodes exist between the first node and the intermediate node, a plurality of second intermediary nodes exist between the intermediate node and the second node, and each of the plurality of first intermediary nodes and each of the plurality of second intermediary nodes has an intermediary maximum transmission unit.

5. A method of facilitating packet transmission, the method comprising:
sending a first packet to an intermediate node, wherein the intermediate node:
determines a packet size, wherein the packet size is a size of the first packet sent from a first node,
determines a maximum transmission unit (MTU) size for a second node, wherein the MTU size is a defined maximum packet size that can be transmitted to the second node, and wherein determining the MTU size includes:
sending the first packet to the second node, and
receiving the MTU size from the second node,
determines whether the packet size is greater than the MTU size, and
responsive to determining that the packet size is greater than the MTU size:
sends a second packet to the first node, the second packet specifying the MTU size to the first node;
recording a destination mark at the first node, wherein the destination mark includes the MTU size and an identifier of the second node;
fragmenting the first packet into a plurality of fragmented packets, wherein the fragmented packets have packet sizes less than or equal to the MTU size; and
sending each of the plurality of fragmented packets to the intermediate node, wherein the intermediate node sends each of the plurality of fragmented packets to the second node.

6. The method of claim 5, wherein, prior to sending an additional packet to the intermediate node, the first node:
determines the identifier of the second node;
locates the destination mark associated with the identifier; and
responsive to locating the destination mark in the first node cache table, fragments the additional packet into a plurality of additional fragmented packets, wherein the additional fragmented packets have packet sizes less than or equal to the MTU size as specified by the destination mark.

7. The method of claim 5, wherein, responsive to receiving the second packet and the MTU size from the intermediate node,
sending a size query to the intermediate node, wherein the intermediate node sends the size query to the second node and a plurality of other second nodes;
receiving the MTU size and a plurality of other MTU sizes associated with the plurality of other second nodes; and
recording the destination mark and a plurality of other destination marks at the first node, wherein the plurality of other destination marks include the plurality of other MTU sizes and a plurality of other identifiers.

8. The method of claim 7, wherein the plurality of other MTU sizes comprises the other MTU sizes which are greater than the packet size.

9. The method of claim 7, wherein the size query includes a security cookie, such that the second node includes the security cookie when sending the MTU size to the intermediate node and, responsive to receiving the security cookie with the MTU size, the first node records the destination mark.

10. The method of claim 5, wherein the destination mark further includes a timeout value, wherein upon expiration of the timeout value, the destination mark is removed from the first node.

11. A system of facilitating packet transmission, the system comprising:
a first node, including a first node memory and one or more first node processors in communication with the first node memory;
a second node, including a second node memory and one or more second node processors in communication with the second node memory; and
an intermediate node, including an intermediate node memory and one or more intermediate node processors in communication with the intermediate node memory, the intermediate node configured to:
receive a first packet, from the first node;
determine a packet size, wherein the packet size is a size of the first packet received from the first node;
determine a maximum transmission unit (MTU) size, for the second node, wherein the MTU size is a defined maximum packet size that can be transmitted to the second node, and wherein determining the MTU size includes:
sending the first packet to the second node, and
receiving the MTU size from the second node;
determine whether the packet size is greater than the MTU size;
responsive to determining that the packet size is greater than the MTU size:
send a second packet to the first node, the second packet specifying the MTU size to the first node;
wherein the first node is configured to:
record a destination mark at the first node, wherein the destination mark includes the MTU size and an identifier of the second node,
fragment the first packet into a plurality of fragmented packets, wherein the fragmented packets have packet sizes less than or equal to the MTU size, and
send each of the plurality of fragmented packets to the intermediate node, and
wherein the intermediate node is further configured to:
receive each of the plurality of fragmented packets, from the first node; and
send the fragmented packets to the second node.

12. The system of claim 11, wherein the intermediate node is an L2 bridge, such that the first packet is received, by the L2 bridge, on a first link, the first packet is sent, from the L2 bridge to the second node, on a second link, and the second packet is sent, from the L2 bridge to the first node, on the first link.

13. The system of claim 12, wherein the first link has a first link MTU size and the second link has a second link MTU size, such that determining the MTU size includes determining the first link MTU size and determining the second link MTU size.

14. The system of claim 11, wherein a plurality of first intermediary nodes exist between the first node and the intermediate node and a plurality of second intermediary nodes exist between the intermediate node and the second node.

15. The system of claim 14, wherein each of the plurality of first intermediary nodes and each of the plurality of second intermediary nodes has an intermediary maximum transmission unit.

16. The system of claim 11, wherein the first node and the second node are virtual machines, implemented by a hypervisor.

17. The system of claim 11, wherein the first node is a source node on a media access control (MAC) layer and the second node is a destination node on the MAC layer.

18. The system of claim 11, wherein the first node has a cache table that records the destination mark.

* * * * *